United States Patent [19]

Dono et al.

[11] Patent Number: 5,103,340
[45] Date of Patent: Apr. 7, 1992

[54] MULTIPLE-CAVITY OPTICAL FILTER USING CHANGE OF CAVITY LENGTH

[75] Inventors: Nicholas R. Dono, Hopewell Junction; Paul E. Green, Jr., Mount Kisco, both of N.Y.; Philippe A. Perrier, Viroslay, France

[73] Assignee: International Business Machines Corporation, Armonk, N.Y.

[21] Appl. No.: 312,284

[22] Filed: Feb. 21, 1989

[51] Int. Cl.$^5$ .......................... G02B 26/00; G02F 1/21
[52] U.S. Cl. .................... 359/578; 359/579; 356/252
[58] Field of Search ............... 350/163, 311, 317, 372, 350/374, 617; 356/345, 346, 352; 372/20, 99

[56] References Cited

U.S. PATENT DOCUMENTS

| | | | |
|---|---|---|---|
| 3,373,651 | 3/1968 | Mack et al. | 356/352 |
| 4,225,236 | 9/1980 | Sandercock | 356/352 |
| 4,498,179 | 2/1985 | Wayne et al. | 372/99 |
| 4,550,410 | 10/1985 | Chenausky et al. | 372/20 |
| 4,627,728 | 12/1986 | Willson | 356/352 |
| 4,861,136 | 8/1989 | Stone et al. | 356/352 |
| 4,896,948 | 1/1990 | Dono et al. | 350/317 |
| 4,920,541 | 4/1990 | Baumgartner et al. | 372/20 |

*Primary Examiner*—Rodney B. Bovernick
*Assistant Examiner*—R. D. Shafer
*Attorney, Agent, or Firm*—Douglas W. Cameron

[57] ABSTRACT

This invention describes a tunable optical filter to be used in an optical communication system. The filter of this invention has a pair of resonator cavities which are cascaded. The lengths of each of the cavities change simultaneously with the change in length of a piezoelectric sleeve which contacts a reflective surface of each of the cavities through spacers. The sleeves and spacers are set so as to move the reflecting surfaces of the cavities along a single axis in response to a single control signal. When optical signals are passed through the two cavities and when the ratio of the length of the cavities is adjusted to a predetermined ratio of integers, the resonator cavity will resonate at a desired wavelength.

5 Claims, 2 Drawing Sheets

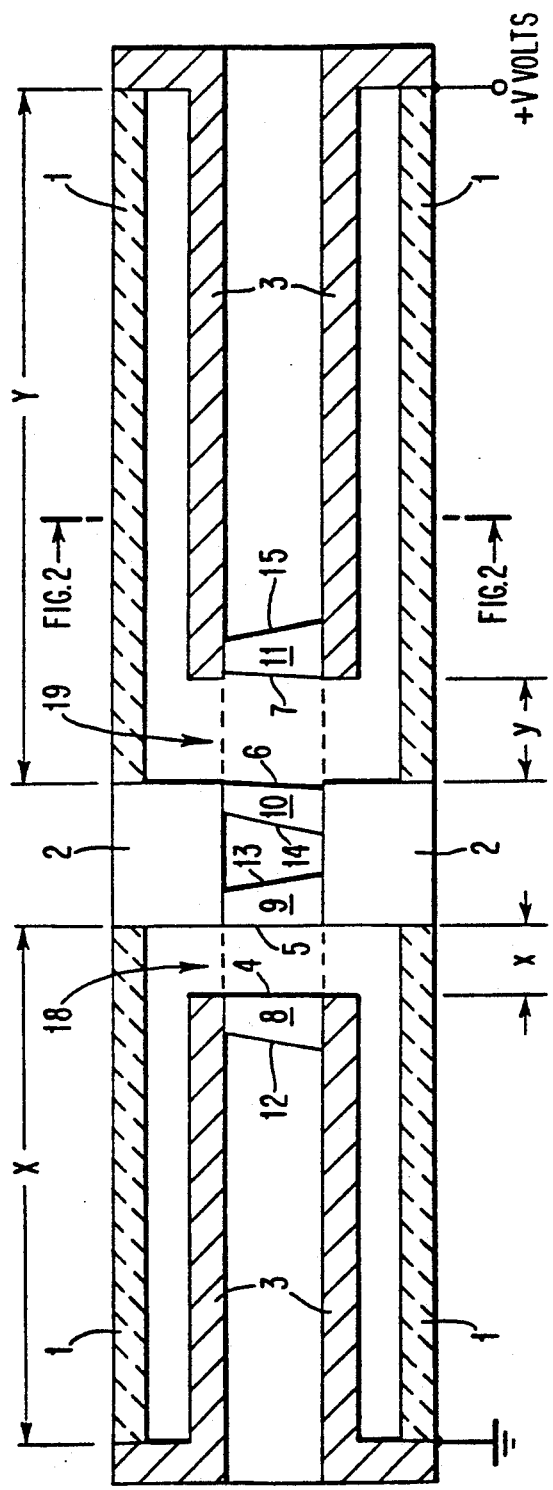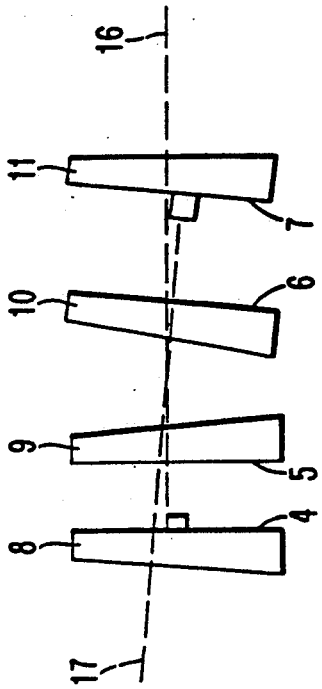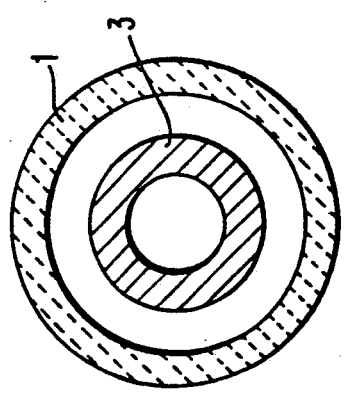

MULTIPLE-CAVITY OPTICAL FILTER USING CHANGE OF CAVITY LENGTH

DESCRIPTION

1. Technical Field

The present invention generally relates to tunable optical filters used in lightwave communications, lasers and spectroscopy. More specifically, this invention describes a simplified tunable optical filter which is tuned by simultaneously varying the lengths of the cavities of the filter using a single control signal.

2. Description of the Prior Art

In improving the wavelength-discriminating ability of optical filters, i.e., in effecting an increase in the effective finesse, two approaches have been followed: (1) improving the finesse of a single cavity filter by careful attention to the mirror properties and (2) passing the light through a cascaded sequence of several cavities, while insuring that at only certain desired wavelengths all cavities resonate together while at most other wavelengths not all cavities pass the incident light with full strength. The effective finesse of the cascade is much higher than that of either cavity individually. The multi-cavity scheme, while effective and sometimes used, has a great disadvantage in flexibility, since the adjustments of the several cavities must be made independently. Single cavity Fabry-Perot filters have been widely described, for example in the book by G. Hernandez, *Fabry-Perot Interferometers*, Cambridge Uni. Press, 1986, and the article by S. R. Mallinson, *Wavelength-Selective Filters for Single-Mode Fiber WDM Systems using Fabry-Perot Interferometers*, Applied Optics, Vol. 26, 1987, pp. 430-436. Multiple-cavity filters have been described too, for example in J. E. Mack, D. P. McNutt, F. L. Roesler and R. Chabbal, *The PEPSIOS Purely Interferometric High-Resolution Scanning Spectrometer*, Applied Optics, Vol. 2, 1963, pp. 873-885; also, J. E. Mack, D. P. McNutt and F. L. Roesler, *Interferometric Spectrometer Utilizing Three Fabry-Perot Etalons in Series*, U.S. Pat. No. 3,373,651, March 1968, and in A. A. M. Saleh and J. Stone, *Two-Stage Fabry-Perot Filters As Demultiplexors In Optical FDMA LANs*, IEEE Jour. of Lightwave Tech., Vol. 7, Feb. 1989. A special three-mirror version of the two-cavity filter has been described by S. J. Hogeveen and M. van der Stadt, *Fabry-Perot Interferometers With Three Mirrors*, Applied Optics, Vol. 25, No. 22, pp. 4181-4184, 1986.

In the prior art, the two (or more) cavities are separate structures and usually require that two control voltages be manipulated separately, requiring two control servo loops, not just one. First, peak number n of Fabry-Perot Cavity I is tuned to and locked in on the desired wavelength, and then peak number m of Fabry-Perot Cavity II is tuned to and locked in on the same wavelength. This sort of procedure is tolerable only in a research "optical bench" environment.

In the work of Saleh and Stone, the authors analyzed the improvement in overall wavelength spectral transfer function by using two cavities instead of one. In this work it was assumed that the cavities are controlled separately. They analyzed structures composed of two separate two-mirror cavities in cascade and a second "three-mirror" structure in which the right mirror of the left cavity and the left mirror of the right cavity are the same mirror as proposed earlier by Hogeveen and van der Stadt. To prevent spurious resonance peaks (due to standing waves between the first and third mirrors), this three mirror version relies on control of the reflectance of the three mirrors so that they obey a certain ratio to each other within a certain tolerance. In the conventional four-mirror version of a two-cavity filter, other means (such as slightly tipping the second cavity relative to the first, as discussed below) are used to suppress spurious reflections.

In the PEPSIOS device of Mack, et al., the tuning was not carried out by changing the spacing only, as with the present invention. In the PEPSIOS device tuning was done by changing gas pressure in all cavities in concert and by different amounts, thus changing the index in all cavities by different amounts. The use of variable gas pressure (not adjustable spacing) to get the desired change of resonant frequency was quite complex. Apparently the reason Mack, et al. had to do this was either that they did not think of using piezoelectric materials for the purpose, or the materials available at the time were not good enough. At any rate, they used differential gas pressure in all three chambers (each containing one of the cascaded Fabry-Perot cavities) not only to scan the whole assembly in wavelength once the three cavities were tuned to coincidence, but to set the coincidence in the first place. An elaborate series of needle valves, etc. was used to make sure that the gas pressures in the three chambers were not the same, but changed by an appropriate amount.

J. Sandercock (*Fabry-Perot Interferometer*, U.S. Pat. No. 4,225,236 dated Nov. 1977) was apparently in search of the same kind of device we have devised: with one control voltage to be able to control two (or more) cavities simultaneously. However, the solution he came up with is very complex and massive, unlikely to be usable in a situation where simplicity, low cost and/or rapid returning are required. The Sandercock apparatus consisted of a large horizontally translating optical stage, the horizontal position being controlled piezoelectrically. Light entered horizontally from the left and passed through Cavity I (spacing=x) whose left mirror was fixed and whose right mirror was positioned on the piezoelectrically movable optical stage. Off to the right of the stage was another mirror which reflected light back at an angle tipped upward from the horizontal by an angle $\theta$. The reflected light passed at angle $\theta$ through the right hand (movable) mirror of Cavity II (fastened to the stage), thence to the left (fixed) mirror of Cavity II and then out. To tune the device, the stage was moved, and as x changed, y changed by an amount proportional to $\cos \theta$ In Sandercock's device the single piezo element was not connected to the movable mirrors directly, but only indirectly through a large movable structure ("optical stage"). As described in Sandercock's patent, controlling the tolerances of the large structure was formidable problem. In addition, there was no way of choosing the ratio of cavity sizes at the later stages of fabrication as there is with the present invention, since the angle $\theta$ was built into the device from the beginning. All those factors operated to make the Sandercock solution impractical for small, economic and rapidly-tunable structures such as are required for tunable lasers and optical communications.

SUMMARY OF THE INVENTION

This invention solves the aforementioned problems by providing a plurality of resonator cavities and a means for simultaneously moving one of the reflective surfaces of each cavity along approximately a single axis in response to a single control signal. The cavities then resonate at a selected wavelength when optical signals are passed through the cavities along the axis and when the ratio of the lengths of the cavities are adjusted to a predetermined ratio of integers with respect to each other.

It is an object of this invention to provide simple and cost effective tunable optical filter which is tunable over a wide range of wavelenghts.

BRIEF DESCRIPTION OF THE DRAWINGS

The accompanying drawings, together with the written descriptions, illustrate two complete embodiments of the invention. The first one is deemed the most promising, since it is the simplest to fabricate.

FIG. 1 shows a cross-section view of the tunable optical filter for the preferred embodiment for broad tunability.

FIG. 2 shows a cross-section view of the device of FIG. 1 taken at the dashed line of FIG. 1.

FIG. 3 shows the way in which spurious resonances between the two cavities are suppressed by tipping the parallel mirrors of resonator cavity on the right slightly relative to the parallel mirrors of the resonator cavity on the left.

DESCRIPTION OF THE PREFERRED EMBODIMENT

Figure 4:
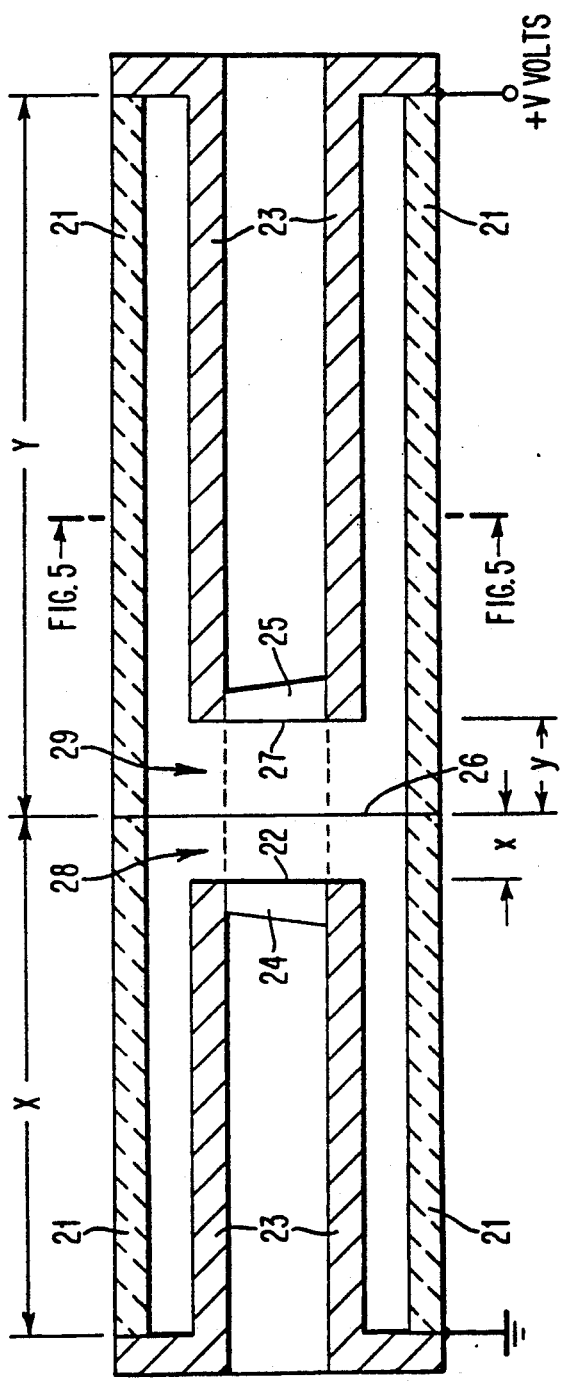
FIG. 4 shows the side view of a similar embodiment that uses not four mirrors, but three.

Shown in FIG. 1 is a tunable optical filter in accordance with the preferred embodiment of the invention. Shown are cylindrical sleeves 1 in contact with and on opposite sides of conductive element 2. Spacers 3 contact the end of sleeves 1 and a respective one of the mirrors 8 or 11. Reflective surfaces 4 and 5 of mirrors 8 and 9, respectively, face the interior of resonator cavity 18, while reflective surfaces 6 and 7 of mirrors 10 and 11, respectively, face the interior of resonator cavity 19. The term resonator cavity shall refer to the space between a pair of reflective surfaces and the two mirrors on which the reflective surfaces appear, while the length of the resonator cavity is the distance between the reflective surfaces of the resonator cavity. For example, in FIG. 1 the two resonant cavities 18 and 19 of lengths x and y, respectively, are formed by the pair of reflective surfaces 4 and 5 and the pair of reflective surfaces 6 and 7, respectively. Reflective surfaces 4 and 5 are coated on pieces of glass 8 and 9, respectively, with the other surfaces 12 and 13 being bevelled, in accordance with existing practice, to prevent spurious resonances by repeated reflections (standing waves). Similarly, reflective surfaces 6 and 7 are coated on pieces of glass 10 and 11, with the other surfaces 14 and 15 being bevelled for the same reason. The length of the sleeve 1 on the left side of FIG. 1 is X, while the length of the sleeve on the right side of the FIG. 1 is Y.

It is a well known idea that a cascade of two Fabry-Perot interferometers will have greater selectivity than each individually. If cavity 18 resonates at wave-length $\lambda$, it does so because its effective mirror spacing is $x = n\lambda/2$ where n is an integer. The effective mirror spacing is that actual spacing between the mirrors times the effective refractive index of the medium between the mirrors. Spectral peaks in the filter passband will be separated by the free spectral range $$FSR_1 = c/2x = f/n$$

where c is light velocity and f is the frequency. If on the other hand, a second cavity 19 is cascaded with the first, so that the incident of light has to traverse cavity 18 and then cavity 19, and if the effective mirror spacing of cavity 19 resonating with $\lambda$ is different from x, namely $y = m\lambda/2$, then its free spectral range is $$FSR_1 = c/2y = f/m$$

Thus, the transmission spectrum of cavity 18 has teeth spaced f/n apart and similarly f/m apart for cavity 19. By picking m and n to be integers close to each other, one can assure that full transmission through both cavities will occur only for teeth that are far apart, thus creating a very high effective finesse. It can be shown that the overall FSR of the cascade is the least common multiple of the individual FRSs. Since the finesse of a single cavity is usually limited by manufacturing tolerances on mirror planarity, roughness and parallelism, the cascade approach is a powerful tool for building high resolution devices from two or more devices of poorer quality.

Collimated light enters from the left in FIG. 1, passes through two successive cavities 18 and 19, and exits at the right. The overall length (X+Y) of a cylindrical piezoelectric sleeve 1 is controlled by the applied voltage V. The relationship between length and voltage need not be linear; what is required is that the piezoelectric stretching of the sleeve 1 be uniform along its length. Sleeve 1 is interrupted by a solid conducting cylinder 2. Conducting cylinder 2 is required to compensate exactly for the non-zero spacings between reflective surfaces 5 and 6. Inside the two halves of the sleeve 1 are two rigid cylindrical spacers 3 made of low temperature coefficient metal. These spaces also serve as electrical contacts to the ends of sleeve 1.

A plane parallel to reflective surfaces 6 and 7 of resonator cavity 19 is canted a small amount (a fraction of a degree is sufficient for reasonably high finesse) from a plane of parallel reflective surfaces 4 and 5 of resonator cavity 18 in order to attenuate the buildup of spurious standing wave resonances between, for example, the left mirror of resonator cavity 18 and the right mirror of cavity 19. This is shown in detail in FIG. 3, in which axis 16 is a line normal to reflective surfaces 4 and 5 and line 17 is a line normal to surfaces 6 and 7. Hence, when the resonator cavities change length in response to the single control voltage, the reflective surfaces move along a single axis, although two of them are tipped slightly from the axis.

When initially adjusted, reflective surfaces 4 and 5 are set to resonate (transmit light) on the test wavelength $\lambda$ by being separated at a known number n of half-wavelengths distant from each other (i.e., $x = n\lambda/2$). Then, keeping $\lambda$ and x constant, reflective surface 7 is similarly adjusted to resonate (transmit light) by being separated by a known different number m of half-wavelengths from mirror surface 6 (i.e., $y = m\lambda/2$).

The lengths of rigid sleeves 1 are critical. Denote by X the distance between the left end of piezo sleeve 1 and reflective surface 5. Similarly, let Y be the distance between right end of piezo sleeve 1 and reflective surfaces 6. It is required that if X is some arbitrary large multiple (K=say 10s to 100s) of x, then similarly Y must equal Ky.

Given the spacings just listed, the device operates as follows. When it is desired to tune to an arbitrary wavelength the required single voltage is applied to the piezo sleeve 1. When this voltage is the right amount to resonate resonator cavity 18 to the new wavelength, this must mean that there are n half-waves of the new wavelength standing in cavity 18. Tracing the distance relations defined above, one sees that X=Kx, then Y=(m/n)Kx, then y=Y/K=(m/n)x, as required.

There is a good reason for attaching the piezo sleeve at the far distant points K times the mirror spacings instead of using a much shorter sleeve stretching only from the left mirror of cavity 18 the right mirror of cavity 19. Piezoelectric material has the limitation that the fractional stretch of length $\Delta l/l$ of known materials is limited to about one percent. Thus, if the sleeve 1 had been attached at the outer mirror positions, the tuning range ($\Delta f/f$) would have been limited to one percent. By using the K:1 "mechanical advantage" of the wider attachment spacing, one gains a tunability of about K percent. Most commercial single cavity Fabry-Perot tunable filters are made using this mechanical advantage for just this reason.

Figure 5:
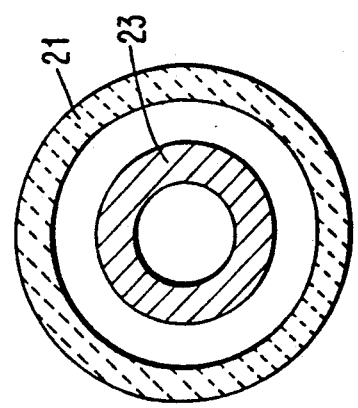
FIG. 5 shows a cross-section of the device of FIG. 4 taken at the dashed line of FIG. 4.

Another embodiment of the invention is shown in FIGS. 4 and 5. It uses a "three-mirror" design, instead of the four mirrors of the preferred embodiment described above in FIGS. 1, 2 and 3. The piezo sleeve 21 of FIGS. 4 and 5 is now a continuous one, not interrupted by the conductive cylinder 2 as in FIG. 1, as was required in the former embodiment to exactly make up for the central mirror structure. In place of the central assembly of two mirrors, there is now a single mirror 26 whose reflectivity in both directions is exploited to form resonator cavity 28 which includes mirrors 24 and 26 and resonator cavity 29 which includes mirrors 26 and 25. Mirror 26 is shown as a thin line in FIG. 4, but in practice it would be a thin slab of glass with a reflective coating on one side and an anti-reflection coating on the other. The slight tipping of one cavity relative to the other that was required in the preferred embodiment of FIG. 1 (as in FIG. 3) is unnecessary with the three-mirror device, since secondary resonances are controlled by careful choice of mirror reflectance. As with FIG. 1, shown also in FIG. 4, are spacers 23 contacting mirrors 24 and 25. The length x of cavity 28 is the distance from reflective surface 22 of mirror 24 and the reflective surface of mirror 26, and the length y of cavity 29 is the distance from the reflective surface of mirror 26 and the reflective surface 27 of mirror 25. The distance X from the left end of sleeve 21 to mirror 26, and the distance Y from mirror 26 to the right end of sleeve 21 is also shown in FIG. 4. Note particularly, the application of a single control signal (V volts) to sleeve 21. Again, the spacing relationships x/y=n/m=X/Y and X/x=Y/y=K must hold, and if they do, a device tunable over a wide range with a single control voltage is obtained. This invention is also applicable to filters having more than two cavities or nonplanar mirror structures such as confocal mirrors.

As an example of more detail on a potential two-cavity embodiment, one could make the following design choices. Wavelength=1.5 microns; integer n=100; x=50×1.5=75 microns; free spectral range of the first cavity at 1.5 microns=$1.5^2/2x$=0.015 microns; integer m=104; y=78 microns; free spectral range of the second cavity at 1.5$\mu$=$1.5^2/2y$=0.14423 microns; effective total free spectral range=26×0.014423=25×.015=0.375 microns; K (lever arm factor)=100. Typical materials would include PZT (lead zirconite-titanate) stacks or cylinders for the piezoelectric sleeve, invar for the cylindrical spacers, and optical grade glass for the mirror structures. Typical values for voltage V would be zero to 500 volts.

Having thus described our invention, what we claim as new and desire to secure by Letters Patents is:

1. A tuntable optical filter comprising:
   a) a pair of resonator cavities, each of said resonator cavities having reflecting surfaces at each of two opposite ends of a length of said each cavity, said surfaces facing the interior of said cavities and said surfaces being orthogonal to, or approximately orthogonal to, an axis which runs along said lengths of said cavities; a pair of piezoelectric sleeves surrounding said cavities with the lengths of both of said sleeves being parallel to said axis, said sleeves also being in contact with and on opposite sides of a conductive element between said pair of sleeves, said sleeves also changing length when a single control voltage is applied to one end of one of said sleeves and when an end of the other of said sleeves is grounded; and
   c) a pair of spacers, each spacer being in contact with one of said sleeves and one of said reflective surfaces, said spacers causing one of said reflecting surfaces of each of said cavity to move in opposite directions along said axis when said sleeves change in length in response to said control voltage;
   said resonator cavities resonating at a selected wavelength when optical signals are passed through said cavities along said axis and when the ratio of the lengths of the cavities are adjusted to a predetermined ratio of integers with respect to each other.

2. A tunable optical filter, comprising:
   a) a pair of resonator cavities, each of said resonator cavities having reflecting surfaces at each of two opposite ends of a length of said each cavity, said surfaces facing the interior of said cavities and said surfaces being orthogonal to, or approximately orthogonal to, an axis which runs along said lengths of said cavities;
   b) a pair of piezolectric sleeves surrounding both of said cavities with the length of said sleeve being parallel to said axis, said sleeve changing in length when only a single control voltage is applied to one end of said sleeve and when the other end of said sleeve is grounded; and
   a pair of spacers, one of said spacers being in contact with the other end of said sleeve, while the other of said spacers is in contact with the other end of said sleeve, said spacers causing one of said reflecting surfaces of each of said cavities to move in opposite directions along said axis when said sleeves change in length in response to said control voltage;
   said resonator cavities resonating at a selected wavelength when optical signals are passed through said cavities along said axis and when the ratio of the lengths of the cavities are adjusted to a predetermined ratio of integers with respect to each other.

3. A tunable optical filter as recited in claim 2, wherein each of said piezoelectric sleeves is a ceramic cylinder and wherein said resonator cavities and said spacers are the interior of said sleeves.

4. A tunable optical filter as recited in claim 3, wherein each of said spacers contacts the outside of said cylinder and extends through the interior of said cylinder where said each spacer contacts a respective one of said reflecting surfaces of one of said resonator cavities.

5. A tunable optical filter comprising:
   a) a plurality of resonator cavities, each of said resonator cavities having reflective surfaces at each of two opposite ends of a length of each; and
   b) means for simultaneously moving one of said reflective surfaces of each of said resonator cavities along a single axis in response to only a single control signal, said moving means having a piezoelectric sleeve surrounding each of said resonator cavities, each said sleeve changing in length in response to said single control signal causing one of said reflective surfaces of each said resonator cavities to move along said single axis; and said resonator cavities resonating at a selected wavelength when optical signals are passed through said cavities along said axis and when the ratio of the lengths of the cavities are adjusted to a predetermined ratio of integers with respect to each other by said moving means.

* * * * *